United States Patent [19]

Eino et al.

[11] Patent Number: 4,869,237

[45] Date of Patent: Sep. 26, 1989

[54] ELECTRONIC ENDOSCOPE APPARATUS

[75] Inventors: Teruo Eino; Atsushi Amano; Masato Toda, all of Hachioji, Japan

[73] Assignee: Olympus Optical Co., Ltd., Tokyo, Japan

[21] Appl. No.: 162,778

[22] Filed: Mar. 1, 1988

[30] Foreign Application Priority Data

Mar. 2, 1987 [JP] Japan .................................. 62-47361
May 6, 1987 [JP] Japan ................................ 62-110055

[51] Int. Cl.$^4$ ............................................ H04N 7/18
[52] U.S. Cl. ........................................ 128/6; 358/98
[58] Field of Search ............................. 128/6; 358/98

[56] References Cited

U.S. PATENT DOCUMENTS 4,539,586  9/1985  Danna et al. .
4,677,470  6/1987  Cooper et al. ...................... 358/98
4,697,210  9/1987  Toyota et al. ...................... 358/98
4,807,026  2/1989  Nishioka et al. ................... 358/98

FOREIGN PATENT DOCUMENTS 58-46922  3/1983  Japan .
60-80429  5/1985  Japan .
61-50546  3/1986  Japan .

Primary Examiner—Leo P. Picard
Attorney, Agent, or Firm—Armstrong, Nikaido, Marmelstein, Kubovcik & Murray

[57] ABSTRACT

This electronic endoscope apparatus having an insertable part inserted into an observation object and provided with a solid state imaging device imaging the observed image, an image forming optical system forming the observed image on said solid state imaging device and a displaying apparatus displaying an electric signal transmitted from said solid state imaging device, characterized by having a plurality of 1-field memories which can electrically invert the observed image obtained by the image forming optical system.

8 Claims, 13 Drawing Sheets

FIG.4
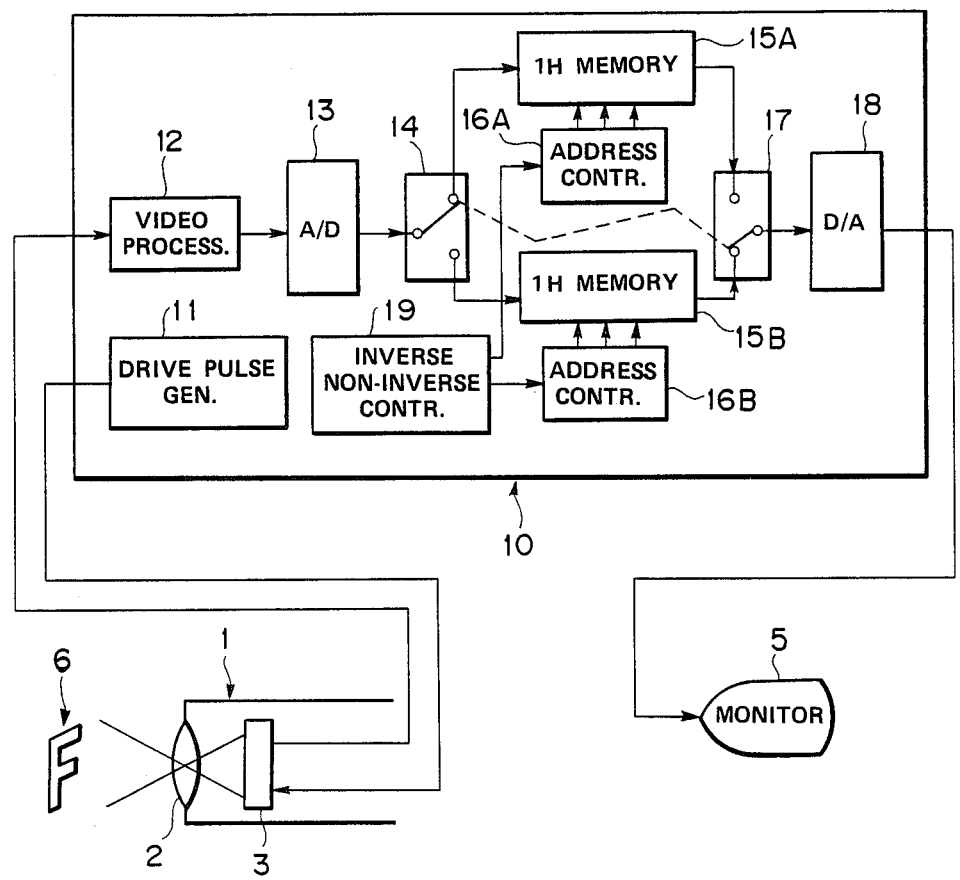
FIG.5(a)  FIG.5(b)
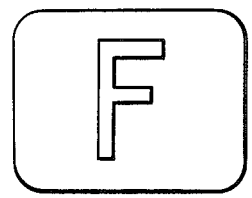 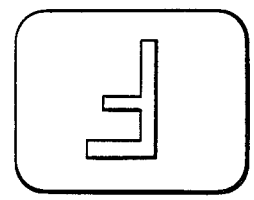

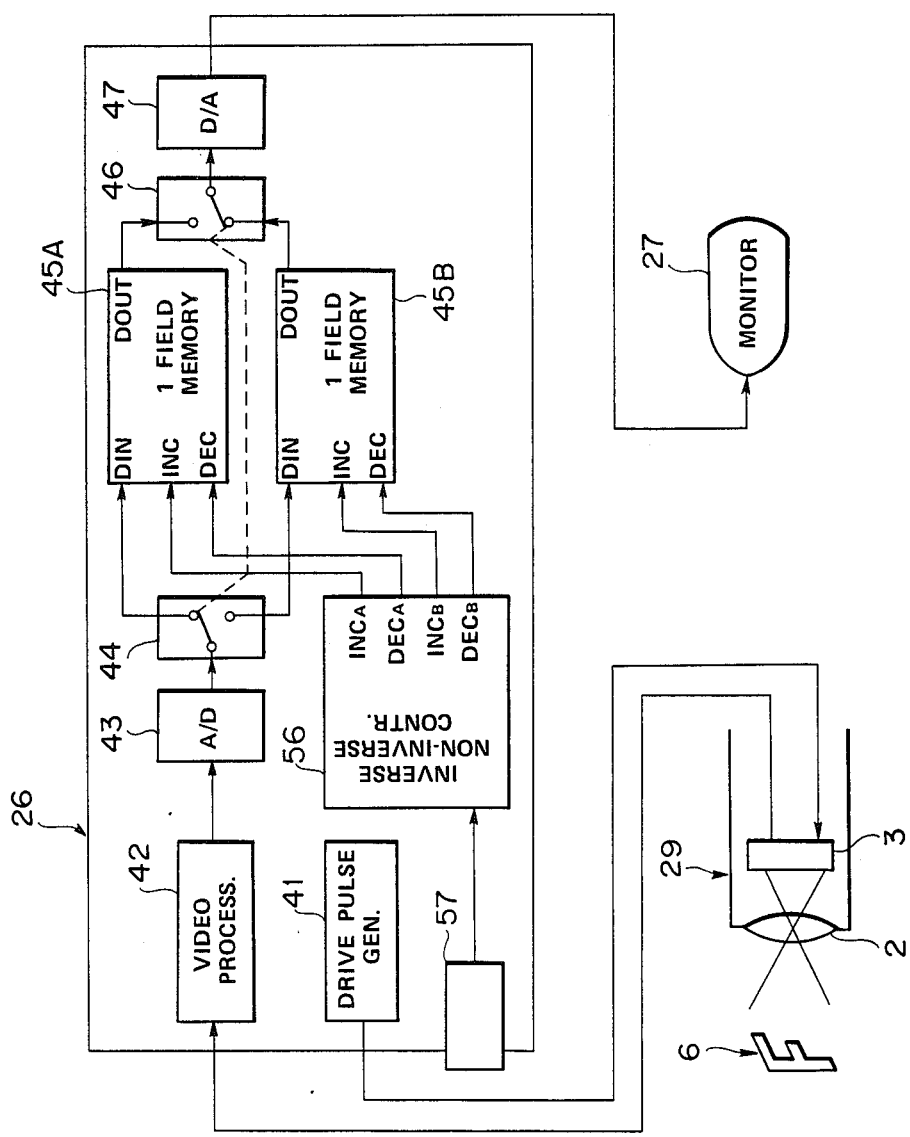

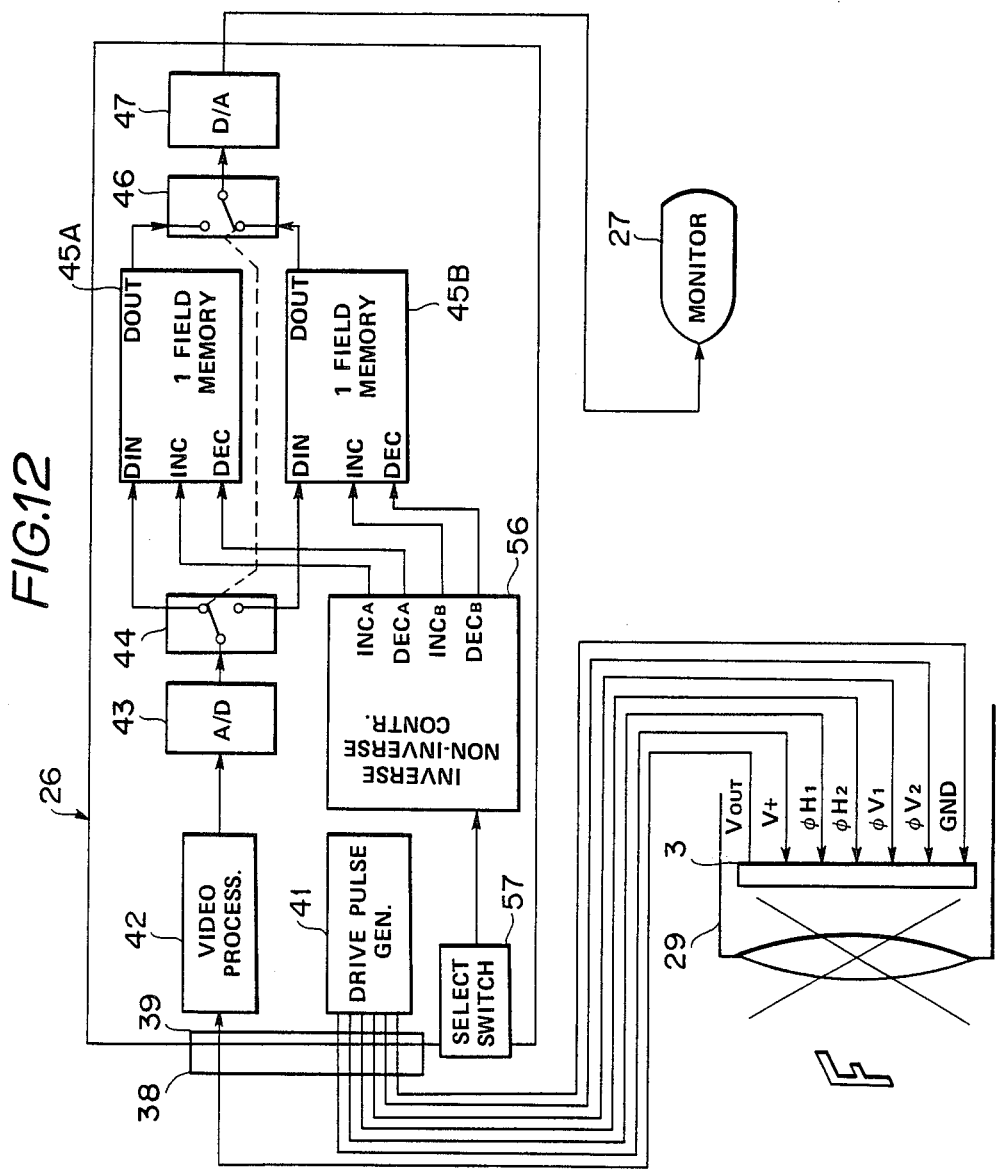

ELECTRONIC ENDOSCOPE APPARATUS

FIELD OF THE INVENTION

This invention relates to an electronic endoscope apparatus whereby an image displayed on a monitor can be inverted and a back image can be converted to a right image.

BACKGROUND OF THE INVENTION

Recently, there is extensively used an endoscope whereby organs within a body cavity can be observed by inserting an elongate insertable part into the body cavity or, as required, various curing treatments can be made by using a treating tool inserted through a treating tool channel.

There are also suggested various electronic endoscopes wherein such solid state imaging device as a charge coupled device (CCD) is used for the imaging means. There are advantages that, as compared with a fiberscope, such electronic endoscope is higher in the resolution, is easier to record and reproduce picture images and is easier in such picture image processes as the magnification of picture images and the comparison of two picture surfaces.

The conventional electronic endoscope is formed as shown, for example, in FIG. 1.

That is to say, an image forming optical system 2 consisting of an objective lens or the like is provided in the tip part 1 of an endoscope insertable part and a solid state imaging device 3 is arranged in the image forming position of this image forming optical system. This solid state imaging device 3 is driven by a driving signal from a driving pulse generating circuit within a video processor 4 connected to the endoscope. The signal read out is processed to be a video signal by a video signal processing circuit within the above mentioned video processor 4. The video signal output from this video signal processing circuit is input into such displaying apparatus 5 as a color CRT monitor in which the observed image of an object 6 is displayed. The picture image displayed in the above mentioned displaying apparatus 5 is such right image as is shown in FIG. 2.

Now, shown in FIG. 1 is a straight viewing type endoscope. As shown in FIG. 3, there is already a side viewing adapter 7 enabling straight viewing by being fitted to the tip part 1 of the above mentioned straight viewing type endoscope. This side viewing adapter 7 contains such reflecting member 8 as a mirror or prism. The image of a side visual fields is reflected by this reflecting member 8 and can be formed in a solid state imaging device through the image forming optical system 2.

Now, when the object is imaged by fitting the above mentioned side viewing adapter 7, the object image will be reflected by the above mentioned reflecting member 8 and therefore, as shown in FIG. 2 (b), an image (back image) inverted only vertically (or only horizontally) will be displayed. It is hard to see as it is. Therefore, conventionally, as shown, for example, in the gazette of a Japanese patent laid open No. 50546/1986, by using a plurality of memories memorizing the video signals in one horizontal scanning period, the signals in each horizontal scanning period are read out from the direction reverse to that at the time of writing in to invert the image horizontally.

An example of the electronic endoscope apparatus provided with such means of inverting the image is shown in FIG. 4.

As shown in FIG. 4, the signal read out of the solid state imaging device 3 driven by the driving signal from a driving pulse generating circuit 11 within a video processor 10 is processed to be $\gamma$-corrected or the like in a video signal processing circuit 12 within the above mentioned video processor 10 and is converted to digital data by an A/D converter 13. The digital data are switched to a 1H memory 15A and 1H memory 15B every horizontal scanning period by a switching circuit 14 and are delivered. These 1H memory 15A and 1H memory 15B memorize respectively time series data in one horizontal scanning period on the basis of address signals output respectively from address controllers 16A and 16B. In this horizontal scanning period in which the data are being written into the 1H memory 15A by a switching circuit 17, the data within the 1H memory 15B are read out and are delivered to the D/A converter 18. On the other hand, in the horizontal scanning period in which the data are being written into the 1H memory 15B, the data within the 1H memory 15A are read out, are delivered to the D/A converter 18, are converted to an analogue video signal by this D/A converter 18 and are delivered to a displaying apparatus. This operation is repeated every horizontal scanning period. The above mentioned address controllers 16A and 16B are formed respectively of counters or the like and sequentially vary the 1H memories 15A and 15B in time series. Also, in these address controllers 16A and 16B, the address variation is switched and controlled to be in the increasing direction or decreasing direction by an inversion and non-inversion control circuit 19.

In such electronic endoscope apparatus, as shown in FIG. 4, in the case of a straight viewing observation, the address controllers 16A and 16B will sequentially vary the memory addresses exactly the same at the time of respectively writing in and reading out the data. That is to say, the time series data in each respective horizontal scanning period are read out in exactly the same order as the order of writing in. As a result, in the displaying apparatus 5, as shown in FIG. 5 (a), a right image will be displayed. On the other hand, as shown in FIG. 3, in the case of a side viewing observation by using the side viewing adapter 7, by the control of the inversion and non-inversion control circuit, the above mentioned address controllers 16A and 16B both vary the addresses in the direction reverse to that of writing in or reading out the data. That is to say, for example, if in response to the time series data in one horizontal scanning period, the addresses are varied from 0 to N in the order of 1, 2, ... and are written into the memories 15A and 15B, at the time of reading out the memories 15A and 15B, the addresses will be varied reversely from N to N-1, N-2, ... 0. As a result, the picture image displayed in the displaying apparatus 5 will be inverted horizontally in the right and left with respect to the imaged image. That is to say, the displayed picture image in the case that exactly the same signal process as in the case of straight viewing is made white using the side viewing adapter 7 is such vertically inverted image as is shown in FIG. 2 (b). Therefore, the displayed picture image in case the above described signal process is made by using the above mentioned video processor 10 will be an image inverted both vertically and horizontally as shown in FIG. 5 (b). That image is the same right image as is shown in FIG. 2 (a) or 5 (a) and is a practically satisfactory image.

However, in the prior art example shown in FIG. 4, the address controllers 16A and 16B are required. Each of these address controllers 16A and 16B must be formed of a synchronous reversible counter of about 10 fits and must be operated at a speed high enough to cover the band of the video signal. Such circuit is complicated and large. If such large counter operates during the horizontal scanning period, digital signals of various frequencies generated there will be likely to mix as noises into the video signal, various vertical stripes will appear on the displayed picture image and the picture quality will remarkably deteriorate.

Thus, in the conventional means of obtaining right images, there are problems that the circuits are so complicated that, only for the function of converting a back image to a right image, the video processor becomes large in the size and high in the cost and the picture quality deteriorates.

In the gazette of a Japanese patent laid open No. 46922/1983, a solid state imaging device is provided with a series line reading out driving circuit in which the direction of horizontally scanning the imaging surface is made reverse to the conventional scanning direction and, in case the image imaged on the imaging surface of the solid state imaging device is a back image, the imaging surface should be scanned reversely to the conventional scanning direction to read out the picture image signal.

Further, in U.S. Pat. No. 4,677,470, there are two 1-line memory groups A and B and, in case A is reading out the address moving up and down for each horizontal line, B will write in the address and, in case A is writing in the address, B will read out the address. As a result, the outputs are alternately inverted horizontally on the right and left for each horizontal line and therefore the technique of continuously outputting output signals of right images is disclosed.

OBJECTS AND SUMMARY OF THE INVENTION

An object of the present invention is to provide an electronic endoscope apparatus wherein, by a simple circuit formation, an image can be inverted and a back image can be converted to a right image.

The electronic endoscope apparatus of the present invention has an imaging apparatus inserted into an observed object part and imaging and converting the observed image to an electric signal and a signal processing apparatus produces a video signal from this electric signal. This video signal is written in at least each field into a memorizing apparatus provided with a plurality of memory regions in each of which at least 1 field part can be memorized in the scanning line number order. The memorizing apparatus reads the video signal in the scanning line number order reverse to the order of writing in out of the memorizing region in which the writing in has been completed. In this memorizing apparatus, the video signal can be read out in the same scanning line number order as in writing in. The video signal read out of the above mentioned memorizing means is displayed by a displaying apparatus.

The other features and advantages of the present invention will become apparent enough with the following explanation.

BRIEF DESCRIPTION OF THE DRAWINGS

FIGS. 1 to 5 relate to a prior art example.

FIG. 1 is an explanatory view showing an electronic endoscope apparatus.

FIGS. 2 (a) and (b) are explanatory views showing examples of straight viewing and side viewing displayed picture images in the case of making the same signal process.

FIG. 3 is an explanatory view showing a side viewing adapter as fitted to the tip part of the insertable part.

FIG. 4 is a block diagram showing the formation of a conventional electronic endoscope wherein the picture image can be inverted.

FIGS. 5 (a) and (b) are explanatory views showing example of the straight viewing and side viewing displayed picture images in FIG. 4.

FIGS. 6 to 9 relate to the first embodiment of the present invention.

FIG. 6 is a block diagram showing the formation of an electronic endoscope apparatus.

FIG. 7 is a block diagram showing the formation of a 1-field memory.

FIG. 8 is a side view showing the entire electronic endoscope apparatus.

FIG. 9 is a perspective view showing a displaying apparatus as fitted with a hood camera.

FIG. 10 is a block diagram showing the formation of an electronic endoscope apparatus.

FIG. 11 is an explanatory view showing an example of a displayed picture image in the apparatus of FIG. 10.

FIGS. 12 to 15 relate to the third embodiment of the present invention.

FIG. 12 is a block diagram showing the formation of an electronic endoscope apparatus.

FIG. 13 is a block diagram showing the formation of a connector part in FIG. 12.

FIGS. 14 (a) and (b) are sectioned views of a connector and connector receptacle.

FIG. 15 is an elevation of a connector receptacle.

DETAILED DESCRIPTION OF PREFERRED EMBODIMENT

The embodiments of the present invention shall be explained in the following with reference to the drawings.

FIGS. 6 to 9 show the first embodiment of the present invention.

Figure 8:
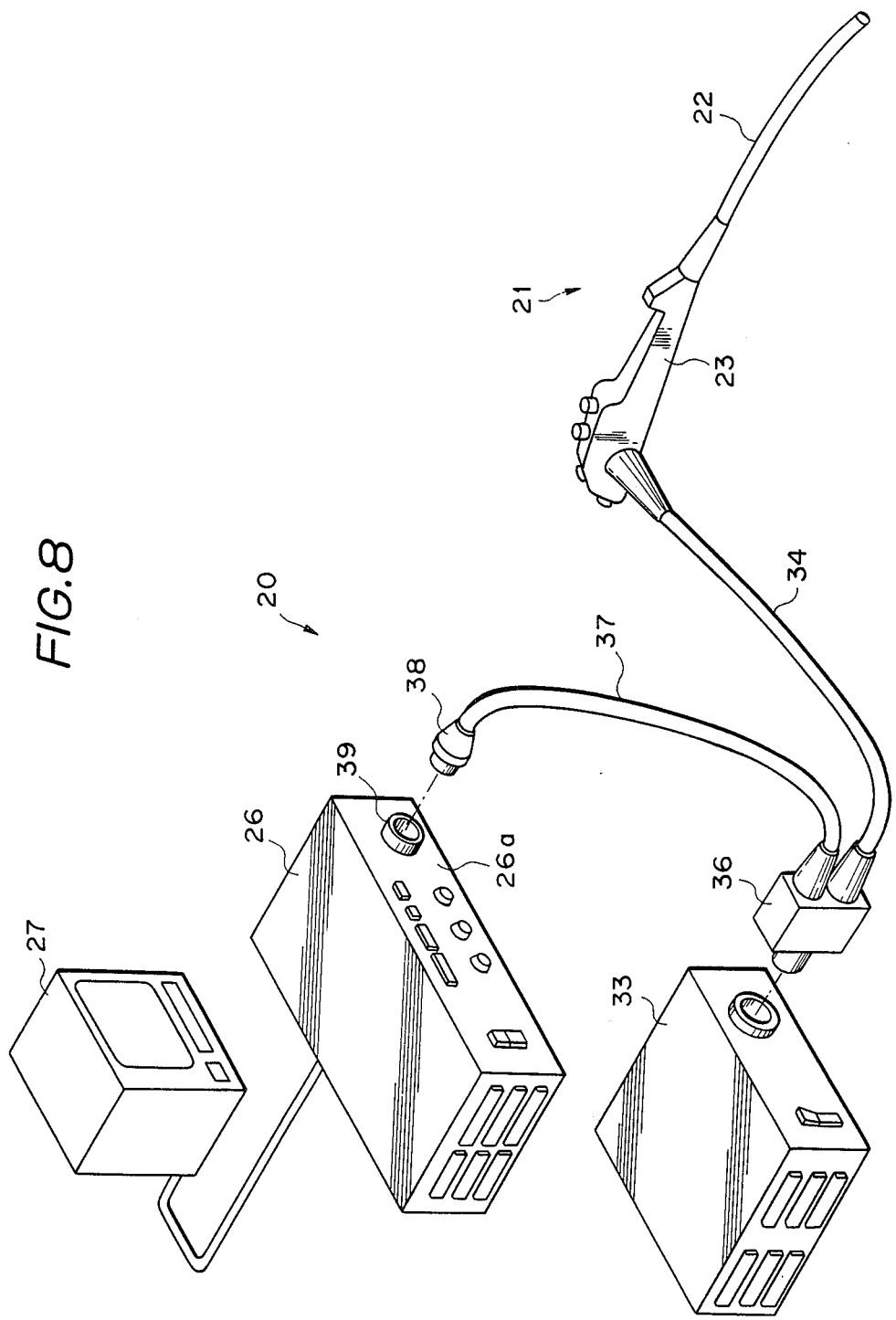
Figure 9:
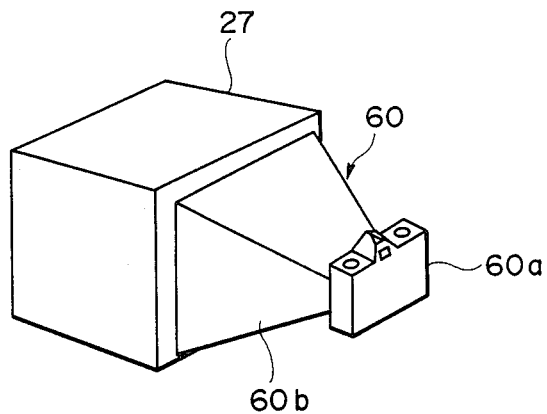
Figure 11A:
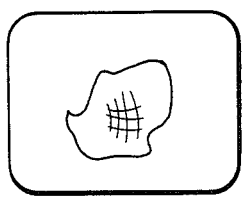
FIGS. 10 and 11 relate to the second embodiment of the present invention.
Figure 11B:
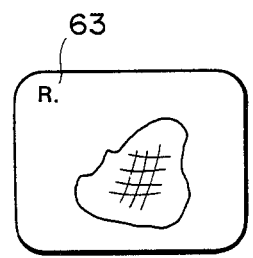
Figure 11C:
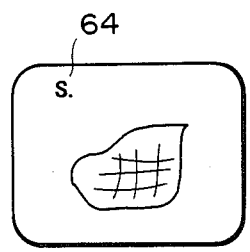
Figure 11D:
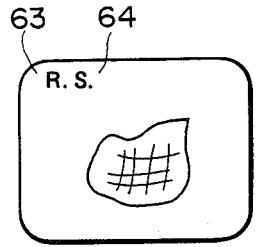

As shown in FIG. 8, the above mentioned endoscope apparatus 20 is formed, for example, of an electronic endoscope 21, a light source apparatus 33, a video processor 26 and a displaying apparatus 27 connected to this video processor 26.

In the above mentioned electronic endoscope 21, a thick operating part 23 is connected to the rear end of an elongate, for example, flexible insertable part 22 and a first cable 34 having a flexibility and internally provided with a light transmitting means and signal-current transmitting means is extended out, for example, sidewise of this operating part 23. An intermediate connector 36 is provided at the tip of this first cable 34 and the above mentioned light transmitting means is connected at one end to the illuminating connector formed in this intermediate connector 36. The illuminating connector of the above mentioned intermediate connector 36 is so formed as to be connected to the above mentioned light source apparatus 33. The illuminating light of a light source not illustrated provided within this light source apparatus 33 is transmitted to the electronic endoscope 21 through the above mentioned light transmitting means. A second cable 37 in which the above mentioned signal-current transmitting means is extended to be internally provided is provided on the above mentioned intermediate connector 36. A connector 38 is formed at the tip of this second cable 37 and is fitted to a connector receptacle 39 provided on the panel 26a of the above mentioned video processor 26 so that the control signal by this video processor 26 may be transmitted to the electronic endoscope 21 through the above mentioned signal-current transmitting means.

As shown in FIG. 6 an image forming optical system 2 consisting of an objective lens or the like is provided in the above mentioned tip part 29 and a solid state imaging device 3 is an imaging means is arranged in the image forming position of this image forming optical system 2. By the way, in case a color picture image is formed by a synchronous system, a color filter array in which color filters transmitting the color lights of R, G and B are arranged in the form of a mosaic will be provided on the front surface of the above mentioned solid state imaging device 3.

Figure 3:
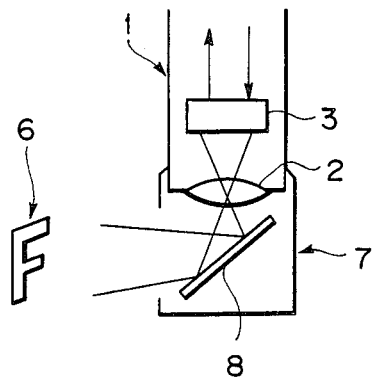

By the way, as shown in FIG. 3, a side viewing adapter 7 can be fitted to the above mentioned tip part 29. This side viewing adapter 7 contains such reflecting member 8 as a mirror or prism so that the image of the sidewise visual field may be reflected by this reflecting member 8 and may be formed on the solid state imaging device 3 through the image forming optical system 2.

On the other hand, the above mentioned video processor 26 is provided with a driving pulse generating circuit 41 so that a driving signal from this driving pulse generating circuit 41 may be fed to the above mentioned solid state imaging device 3 through a signal line inserted through the above mentioned universal cord 37, 34 and insertable part 22 to drive this solid state imaging device 3. The signal read out of this solid state imaging device 3 is input into a video signal processing circuit 42 provided within the above mentioned video processor 26 through a signal line inserted through the above mentioned insertable part and universal cord 37, 34. Such process as a γ-correction is made in the video signal processing circuit 42 to produce a video signal. The video signal from this video signal processing circuit 42 is converted to digital data by an A/D converter 43. The digital data are switched and written into 1-field memory 45A and 1-field memory 45B for each field. For example, in an odd number field, the digital data are written into the 1-field memory 45A. On the other hand, in an even number field, the digital data are written into the 1-field memory 45B.

The outputs of the above mentioned 1-field memories 45A and 45B are input into a switching circuit 46. This switching circuit 46 operates to switch the input side for each field so that the 1-field memory into which no writing is made may be read out. That is to say, for example, in the odd number field, the 1-field memory 45B is read out. On the other hand, in the even number field, the 1-field memory 45A is read out.

The output of the above mentioned switching circuit 46 is converted to an analogue video signal by a D/A converter 47 and is input into the displaying apparatus 27.

Figure 7:
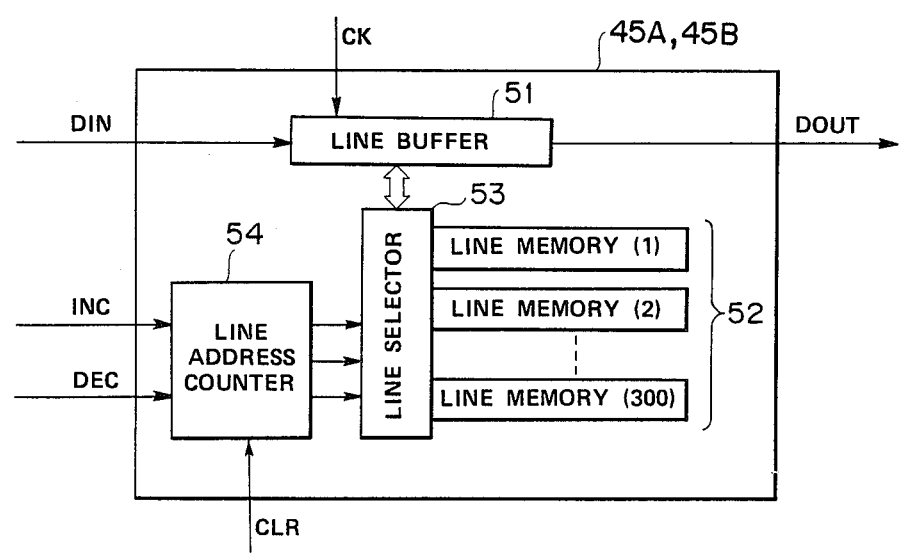

The above mentioned 1-field memories 45A and 45B are formed as shown in FIG. 7.

That is to say, the above mentioned 1-field memories 45A and 45B are provided each with a line buffer 51 memorizing time series data corresponding to 1 horizontal scanning period from the above mentioned switching circuit 44 input from the data input terminal DIN, about 300 line memories 52 provided to be more than the horizontal scanning lines within 1 field and each having a capacity just capable of memorizing the time series data corresponding to 1 horizontal scanning line, a line selector 53 memorizing in the above mentioned line memories data for 1 horizontal scanning period memorized in the above mentioned line buffer 51 and selecting the line memory in the case of reading out of this line memory 52 and a line address counter 54 designating the line address selected by the above mentioned line selector.

The above mentioned address counter 54 has an increasing terminal INC, a decreasing terminal DEC and a clear terminal CLR. When one (INC) pulse is given to the above mentioned increasing terminal INC, the line addresses will increase by one and, when one (DEC) pulse is given to the decreasing terminal DEC, the line addresses will be decreased by one. Also, when a pulse is given to the clear terminal CLR, the line addresses will be set at 0. Thus, the line address of the line address counter 54 is controlled and is given to the above mentioned line selector 53.

When the memory is designated by a control terminal not illustrated to operate to write in, the above mentioned line selector 53 will instantaneously transfer the data for 1 horizontal scanning period memorized in the above mentioned line buffer 51.

Therefore, when a pulse is first given to the CLR terminal of the line address counter 54 to reset the line address at 0, the data for 1 horizontal scanning line part are then input from the DIN terminal to be memorized in the line buffer and one pulse is given to the INC terminal during the horizontal blanking period, the data within the line buffer 51 will be transferred to the line memory 1 and the line addresses will increase by one. When this operation is sequentially carried out, all the data for 1 field will be memorized in each line memory 52. That is to say, in this embodiment, for each horizontal scanning line, one pulse may be only given to the INC terminal and it is not necessary to designate the address from outside.

When the memory reading out operation is designated by a control terminal not illustrated, the data for 1 horizontal scanning line within the line memory 52 selected by the line selector 53 will be instantaneously transferred to the line buffer 51. These data are read in time series out of the output terminal D OUT in response to the horizontal scanning period. In this case, too, when one pulse is given to the INC terminal or DEC terminal every horizontal scanning period, all the data for 1 field will be able to be read out.

By the way, the above mentioned line buffer 51 has a sereal clock input terminal CK. A sereal clock for carrying out in time series in response to the horizontal scanning period the operation in the case of inputting the data into the line buffer 51 from the terminal DIN and in the case of reading the data out of the terminal D OUT is input into this terminal CK.

Also, as shown in FIG. 6, the pulses INC and DEC given to the terminals INC and DEC of the above mentioned 1-field memories 45A and 45B are generated by an inversion and noninversion control circuit 56. This inversion and noninversion control circuit 56 has output terminals INCA and DECA respectively outputting the pulses INC and DEC given to the 1-field memory 45A and output terminals INCC and DECB respectively outputting pulses INC and DEC given to the 1-field memory 45B.

The video processor 26 is provided with a switching switch 57 switching the inversion and non-inversion of the picture image. The above mentioned inversion and noninversion control circuit 56 is different in the pulses given to the above mentioned 1-field memories 45A and 45B at the time of the inversion and at the time of the non-inversion by the above mentioned switching switch 57. That is to say, in case the non-inverting side is selected by the above mentioned switching switch 57, both at the time of writing into the memory and at the time of reading out of the memory, the pulse INC will be fed to 1-field memories 45A and 45B. By the way, in this case, at the time of starting writing in and at the time of starting reading out, a pulse will be given to the terminal CLR of the line address counter 54 within the above mentioned 1-field memories 45A and 45B and the line address will be reset at 0. Therefore, both writing in and reading out start from the scanning line number (line address) 0 and take place in the order of 1, 2, . . . , n (where n is a final scanning line number).

On the other hand, in case the inverted side is selected by the above mentioned switching switch 57, at the time of writing into the memory, the pulse INC will be fed to the 1-field memories 45A and 45B and, at the time of reading out of the memory, the pulse DEC will be fed to the 1-field memories 45A and 45B. By the way, in this case, at the time of starting writing in, a pulse will be given to the terminal CLR of the line address counter 54 but, at the time of starting reading out, no pulse will be given to the terminal CLR. Therefore, the writing in starts from the scanning line number (line address) 0 and takes place in the order of 1, 2, . . . , n and the reading out starts from the scanning line number n and takes place in the order of n-1, n-2, . . . , 0.

By the way, such semiconductor as μPC 41221C made by Nippon Electric Company, Ltd. (NEC) can be used for the above mentioned 1-field memories 45A and 45B.

The operation of this embodiment formed as in the above shall be explained in the following.

As shown in FIG. 6, in the case of a straight viewing observation without fitting the side viewing adapter 7, the non-inverting side is selected by the switching switch 57 of the video processor 26. The signal read out of the solid state imaging device 3 is input into the video signal processing circuit 42 to produce a video signal. The video signal from this video signal processing circuit 42 is converted to digital data by the A/D converter 43. These digital data are delivered as switched to the 1-field memories 45A and 45B for each field by the switching circuit 44. For example, in the odd number field, the digital data are written in the 1-field memory 45A. On the other hand, in the even number field, the digital data are written in the 1-field memory 45B.

In these 1-field memories 45A and 45B, the non-inverting side is selected by the switching switch 57. Therefore, both at the time of writing into the memory and at the time of reading out of the memory, the inversion and non-inversion control circuit 56 will feed the pulse INC to the 1-field memories 45A and 45B. Therefore, both writing in and reading out start from the scanning line number (line address) 0 and take place in the order of 1, 2, . . . , n.

The data are read out of the above mentioned 1-field memory 45A or 45B in which no writing in is made for each field through the switching circuit 46. That is to say, for example, in the odd number field, the data are read out of the 1-field memory 45B. On the other hand, in the even number field, the data are read out of the 1-field memory 45A. The data are converted to an analogue video signal by the D/A converter 47 and are input into the displaying apparatus 27.

Figure 1:
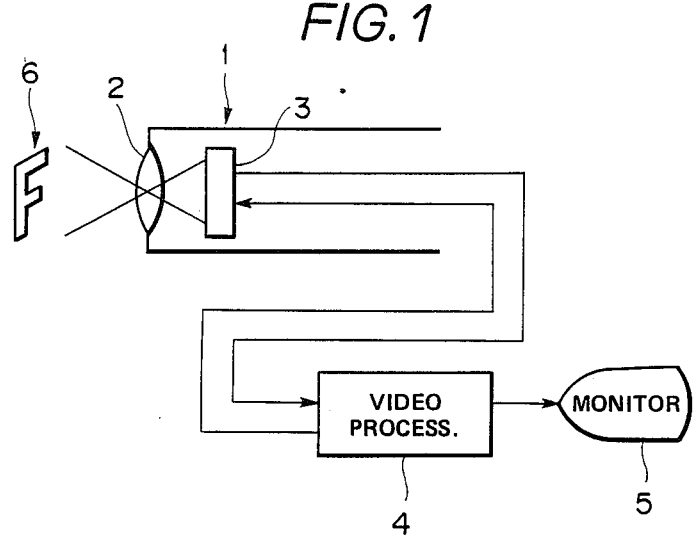
Figure 2A:
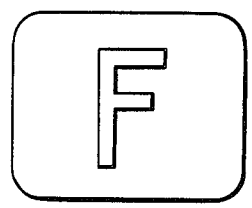
Figure 2B:
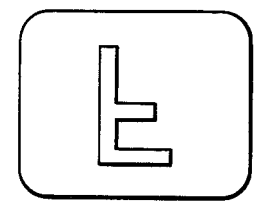

In this case, as shown in FIG. 2 (a), a right image will be displayed in the above mentioned displaying apparatus 27.

On the other hand, as shown in FIG. 3, in the case of a side viewing observation by fitting the side viewing adapter 7, the inverting side is selected by the switching switch 57 of the video processor 26.

In this case, the process until the writing into the above mentioned 1-field memories 45A and 45B is the same as in the case of the above described straight viewing.

In these 1-field memories 45A and 45B, the inverting side is selected by the switching switch 57. Therefore, the inversion and non-inversion control circuit 56 will feed the pulse INC to the 1-field memories 45A and 45B at the time of writing in and will feed the pulse DEC to the 1-field memories 45a and 45B at the time of reading out. Therefore, the writing in starts from the scanning line number (line address) 0 and takes place in the order of 1, 2, . . . , n and the reading out starts from the scanning line number 7 and takes place in the order of n-1, n-2, . . . , 0.

The read out data are converted to an analogue video signal by the D/A converter 47 and the analogue video signal is input into the displaying apparatus 27.

The displayed picture image in case the signal is processed exactly the same as in the case of straight viewing while using the side viewing adapter 7 is a back image inverted vertically as shown in FIG. 2 (b). On the other hand, in this embodiment, in case the inverting side is selected by the above mentioned switching switch 57, the order of the scanning lines at the time of reading out of the above mentioned 1-field memories 45A and 45B will be reverse to that at the time of writing in and therefore the image displayed in the displaying apparatus 27 will be an image made by vertically inverting the image shown in FIG. 2 (B) and will be a right image as shown in FIG. 2 (a). This is not rotated with respect to the image in the case of straight viewing and is the most desirable displaying method. By the way, the data input and output within 1 horizontal scanning line period relating to the line buffer 51 in FIG. 7 are made in the same time series order always in any case and therefore the picture image is not horizontally inverted.

Thus, according to this embodiment, when the pulse INC or DEC is only given to the above mentioned 1-field memories 45A and 45B during the horizontal blanking period every horizontal scanning line period, the back image in the case of using the side viewing adapter 7 can be converted to a right image. Therefore, it is not necessary to provide such address controller as in the prior art example, the circuit can be made very simple and the video processor 26 small in the size and low in the cost can be provided.

There is no address controller generating pulses of various frequencies during the imaging period. Naturally, no wiring from it is present on the printed substrate or the like, therefore pulses of various periods will not mix as noises into the video image and a high quality video image will be obtained.

Also, by switching the switching switch, even in case the number of reflections of the imaging optical system is different, an endoscope of a straight viewing type, side viewing type or fitted with a tip adapter can be connected to the same video processor and a displayed picture image of a right image can be easily obtained.

Further, according to this embodiment, as all the data of an odd number field and even number field, that is, the data corresponding to 1 frame of a television are memorized by the 1-field memories 45A and 45B, as required, by prohibiting writing the data into the 1-field memories 45A and 45B and by only reading out the data, a stationary picture image can be displayed. This is very useful to such case as of recording in a still photograph the picture image displayed in the displaying apparatus 27 by a hood camera 60 having a still camera 60a and a hood 60b fittable to the displaying surface of the displaying apparatus as shown, for example, in FIG. 9.

Figure 10:
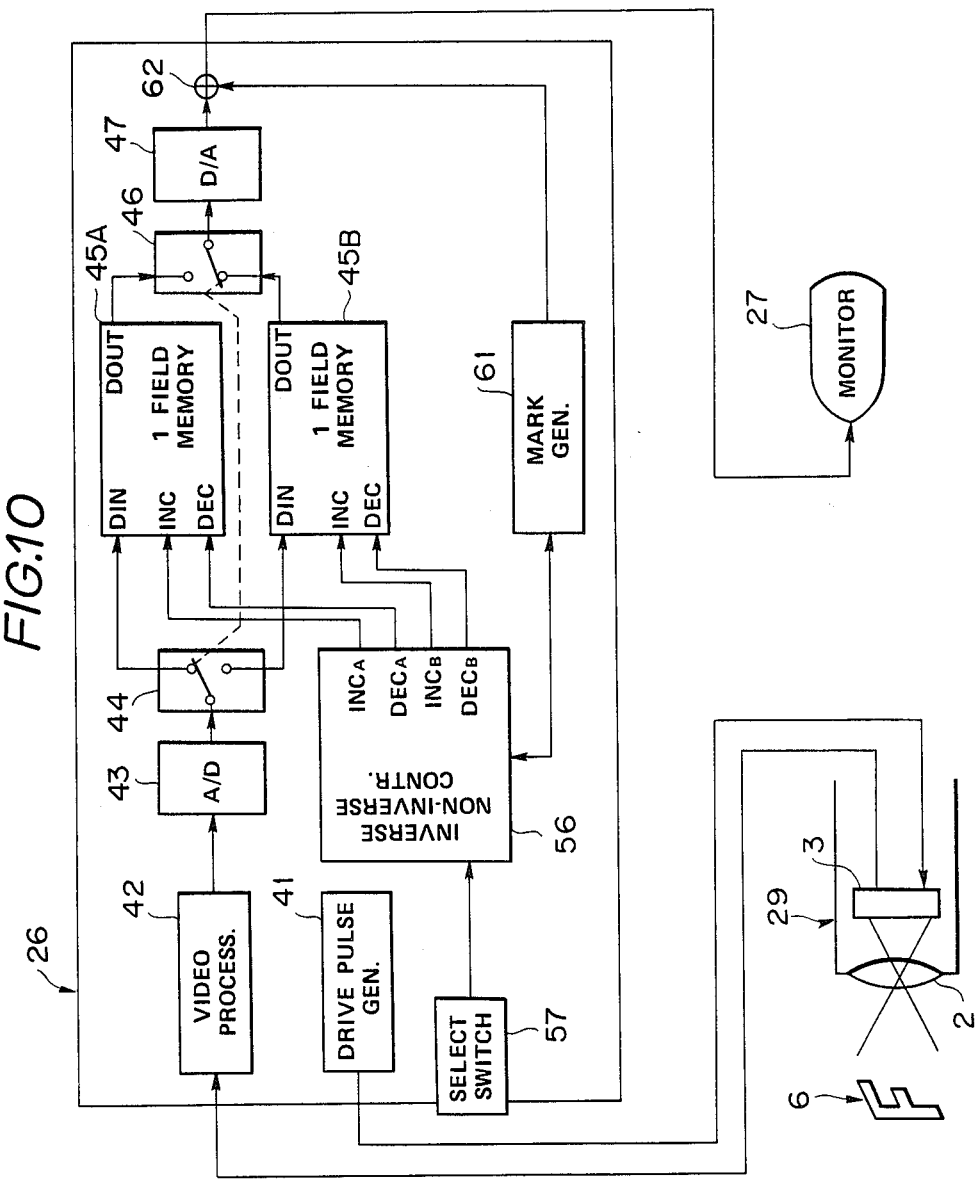
Figure 13:
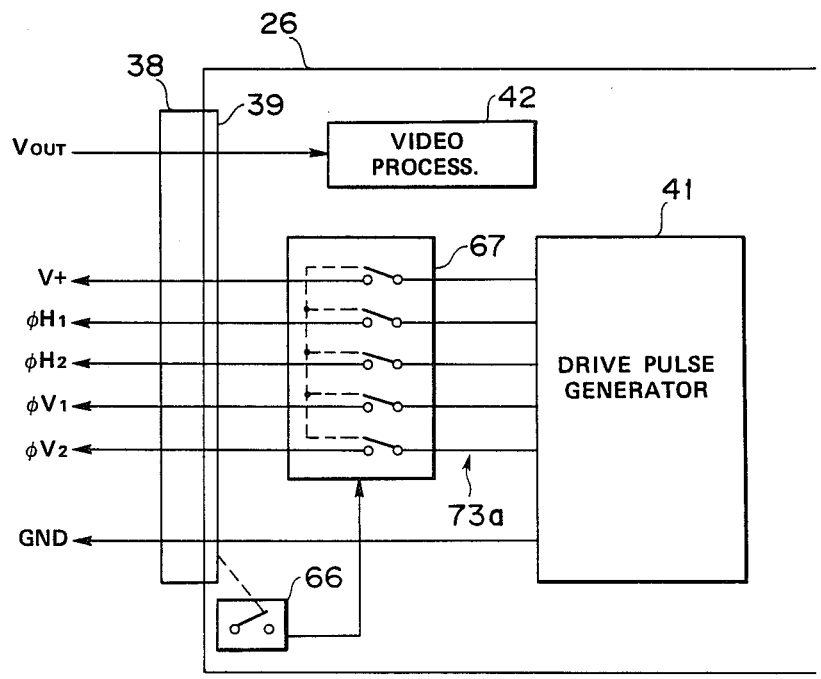

FIGS. 10 and 11 show the second embodiment of the present invention.

In this embodiment, a mark generating circuit 61 is provided within a video processor 26 6to show whether the picture image on the picture surface of the displaying apparatus is inverted or non-inverted.

The mark generating circuit 61 is connected to the inversion and non-inversion control circuit 56 within the video processor 26 and a control signal showing the operating state of the inversion and non-inversion control circuit 56 is to be input into the mark generating circuit 61. A pattern signal is generated from this mark generating circuit 61 so that a predetermined mark may be displayed on the picture surface of the displaying apparatus 27 on the basis of a control signal from the inversion and non-inversion control circuit 56 and is added by an adding circuit 62 to the video signal output from the D/A converter 47.

Here, in case the inversion and non-inversion control circuit 56 is operated in the non-inverted state and an ordinary picture image is displayed in the displaying apparatus 27, no pattern signal will be generated from the mark generating circuit 61 and only the endoscope picture image will be displayed in the picture image as in FIG. 11 (a). Also, in case the switching switch 57 is operated and the inversion and non-inversion control circuit 56 is operated in the inverted state, the inversion and noninversion control circuit 56 will input a control signal showing that the inversion and non-inversion control circuit 56 is operating in the inverting state into the mark generating circuit 61 which will generate a pattern signal, this pattern signal will be superposed on the video signal by the adding circuit 62 and, as in FIG. 11 (b), such discriminating mark 63 which can discriminate the inverted state as, for example, the letter R will be displayed as overlapped on the endoscope picture image.

In case the picture image displayed in the displaying apparatus 27 is inverted as in this embodiment, the discriminating mark 63, that is, R will be superposed and displayed together with the endoscope image, therefore the technician using the endoscope will not mistake the back image and right image for each other in seeing them and the misoperation can be prevented.

Also, in this embodiment, the same as in the first embodiment, 1-field memories 45A and 45B are provided and therefore a stationary picture image can be displayed in the imaging apparatus 27. This function acts by the operation of a switch not illustrated. For example, though a stationary picture image is displayed, when the technician makes an error of greatly moving the insertable part 22 to vary the visual field for the displayed stationary picture image, as a result, the tip part 29 will so severely collide with the object 6 as to hurt or damage the electronic endoscope 21 or the object 6 and to make a very dangerous state. In order to prevent it, in case the stationary picture image is being displayed, as shown i n FIG. 11 (c), a discriminating mark 64, that is, S which can discriminate the stationary picture image will be displayed as superposed on the endoscope picture image. FIG. 11 (d) is of a displaying example of a picture surface showing the inverted state and stationary picture image.

The other formations are the same as of the first embodiment.

In FIG. 12, a direct current source V+, horizontal driving signals $\Phi H1$ and $\Phi H2$, vertical driving signals $\Phi V_1$ and $\Phi V_2$ are applied to the solid state imaging device 3provided within the tip part 29 of the electronic endoscope 21 through the connector 38 and connector receptacle 29 from the driving signal generating circuit 41 provided within the video processor 26 and further a GND as a reference potential of these driving signals is connected the same as the above mentioned driving signals through the connector 38 and connector receptacle 39.

When the connector 38 and connector receptacle 39 are connected or disconnected with each other while the above mentioned driving signals are being output from the driving pulse generating circuit 41, at the moment of this connection or disconnection, some of the driving signals will be fed to the solid state imaging device 3 but the others will not be connected.

Here, the solid state imaging device 3 is such semiconductor device as a charge coupled device (CCD). In case predetermined pulses and direct current voltages are all fed to predetermined electrodes, the inherent operation of the solid state imaging device will be made but, in case any one of them is not fed, not only the function will not be performed but also such abnormal state as latch up will be made, a large current will flow and the insulating oxidized film within the solid state imaging device 3 will be broken to give an irrecoverable damage. It can be easily presumed that there can be many cases that the solid state imaging device 3 is placed in an an electrically abnormal state wherein, for example, the driving pulses $\Phi V_1$ and $\Phi V$ are fed while the direct current voltage V+ is not fed and the other signals are fed while the GND is not connected. In order to prevent such state, a relay 67 as a breaking means breaking the circuits of the respective signal lines by a switch 66 is provided on respective lead lines 73a connecting the connector receptacle 39 with the driving signal generating circuit 41.

Figure 14A:
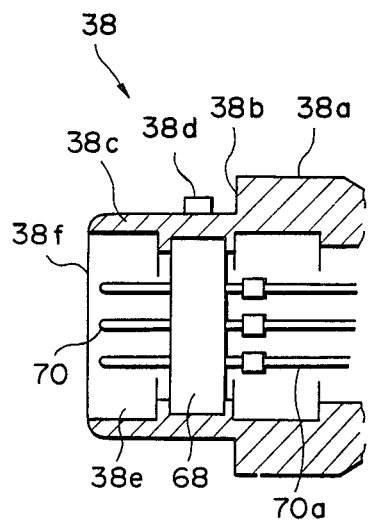
Figure 14B:
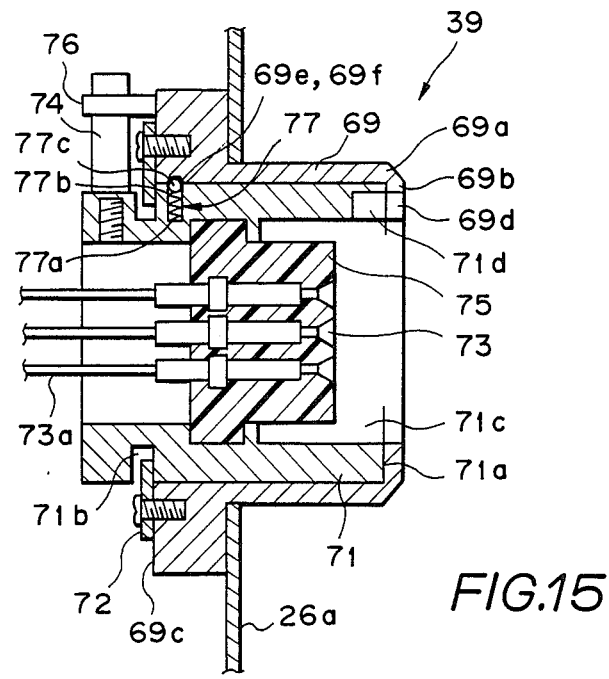
Figure 15:
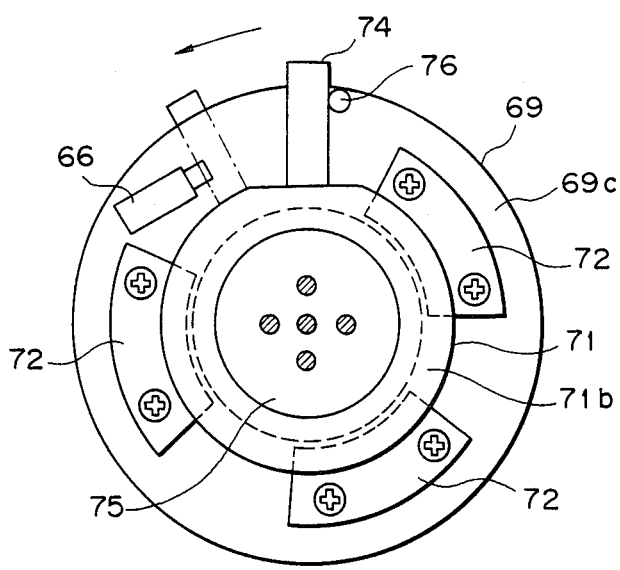

In FIGS. 14 and 15, the formation of the connector 38 and connector receptacle 39 shall be explained.

As shown in FIG. 14 (a), the connector 38 has a large diameter part 38a and a fitting part 38c provided to coaxially project through a step part 38b. A positioning pin 38d projected in the direction at right angles with the axis of this connector 38 is provided on one side of this fitting part 38c.

A hollow part 38e is formed in the axial direction of this connector 38. A holding member 68 having an insulating property is fixed in a position at a predetermined distance from the plug tip surface 38f of this hollow part 38. In this holding member 68, a plurality of male contacts 70 as second contacts are fixed parallelly with the axis of the above mentioned connector 38 and respective conducting lines 70a are connected to these male contacts 70.

On the other hand, in the connector receptacle 39 provided in the above mentioned video processor 26, as shown in FIG. 14 (b), a cylindrically formed fixed frame 69 is inserted and fixed through the panel 26a of this video processor 26 and a rotary frame 71 formed to be longer than this fixed frame 69 is rotatably engaged within this fixed frame 69.

A locking part 69b projected inward of this fixed frame 69 is annularly provided in the tip part 69a on the side reverse to the panel 26a of the above mentioned fixed frame 69 and the tip part 71a of the above mentioned rotary frame 71 is in sliding contact with this locking part 69b. On the other hand, a groove 71b is annularly provided on the outer periphery of the above mentioned rotary frame 71 corresponding to the rear end surface 69c of the fixed frame 69 within the panel 26a. A removal preventing plate 72 engaged with this groove 71a is fixed to the above mentioned rear end surface 69c. The above mentioned rotary frame 71 is rotatably positioned by these locking part 69a and removal preventing plate 72.

Further, a hole 71c having substantially the same diameter as of the fitting part 38c of the above mentioned connector 38 is formed in the axial direction of the above mentioned rotary frame 71. A holding member 75 having an insulating property and formed to be of substantially the same diameter as of the hollow part 38e of the above mentioned connector 38 is fixed in this hole 71c. Female contacts 73 as first contacts with which the above mentioned male contacts 70 engage are fixed to this holding member 75. Conducting lines 73a are connected respectively to these female contacts 73.

Also, grooves 69d and 71d coinciding with each other only in case the rotary frame 71 is rotated to a predetermined position and containing the positioning pin 38d of the above mentioned connector 38 are formed respectively in the tip part 71a of the above mentioned rotary frame 71 and the locking part 69b of the above mentioned fixed frame 69. In case these grooves 69d and 71d coincide with each other, the fitting part 38c of the above mentioned connector 38 will be fitted in the hole 71c of the rotary frame 71 and the male contacts 70 and female contacts 73 will be mechanically connected with each other. When the connection of these male and female contacts 70 and 73 is completed, the above mentioned positioning pin 38d will be positioned in the rear of the locking part 69b of the fixed frame 69 and these connector 38 and rotary frame 71 will thereby become rotatable. When these connector 38 and rotary frame 71 are rotated, the above mentioned positioning pin 38d will contact the locking part 69b of the fixed frame 69, thereby the movement in the direction against the connector 38 will be regulated and the connection of the above mentioned male and female contacts 70 and 73 will not be released.

On the rear end surface 69c of the above mentioned fixed frame 69, a switch 66 switching on and off the conduction to the conducting lines 73a of the above mentioned female contacts 73 is fixed and, on the other hand, a dog 74 pressing the above mentioned switch 66 to be on in case this rotary frame 71 is rotated by a predetermined angle is fixed in the position in the rear of the rear end surface 69c of the fixed frame 69 in the rear of the above mentioned rotary frame 71. On the other hand, a stopper 76 of this dog 74 is arranged on the side opposite the above mentioned switch holding this dog 74 of the above mentioned rear end surface 69c and the rotation in the switch pressing direction and in the reverse direction of the above mentioned rotary frame 71 is stopped by this stopper 76 in the position where the grooves 69d and 71b containing the above mentioned positioning pin 38d coincide with each other.

On the other hand, a hole 77a is formed toward the axis of the fixed frame 71 in the position on the outer periphery of the above mentioned rotary frame 71 and in sliding contact with the inner periphery of the above mentioned fixed frame 71. A rigid ball 77c formed to be projectable by the energizing force of a resilient member 77b is inserted into this hole 77a. On the other hand, a plurality of recesses 69e and 69f with which this hard ball 77c is to be engaged are formed on the inner periphery of the above mentioned fixed frame 69 corresponding to this rigid ball 77c so that, when the above mentioned rigid ball 77c is engaged with the recesses 69e and 69f, the rotation of the above mentioned rotary frame 71 will be fixed in the position where the grooves 69d and 71b coincide with each other and in the position where the above mentioned dog 74 presses the switch 66. By the way, a clicking mechanism 77 is formed of the above mentioned hole 77a, resilient member 77b, rigid ball 77c and recesses 69e and 69f.

The above mentioned conducting line 73a is connected to the above mentioned relay 69 which is operated by the opening and closing of the switch 66. That is to say, when the connector 38 is connected to the connector receptacle 39 and the switch 66 is closed, the relay contact will be closed and, when the switch 66 is opened, the relay contact will be opened. The respective contacts of this relay 67 are connected to the above mentioned driving signal generating circuit 41.

The operation of the connector apparatus by the above described formation shall be explained in the following.

In case the connector 38 and connector receptacle 39 are to be fitted to each other to connect the male and female contacts 70 and 73 with each other, when, by such means as of gripping the above mentioned connector 38, the position of the positioning pin 38d provided in this connector 38 is made to coincide with the groove 69d provided in the fixed frame 69 of the above mentioned connector receptacle 39 and the groove 71d provided in the tip part 71a of the rotary frame 71 and the fitting part 38c of the above mentioned connector 38 is inserted into the hole 71c of the rotary frame 71, then the above mentioned positioning pin 38d will pass through the groove 69d of the locking part 69b and will be contained in the groove 71d of the rotary frame 71 and the holding member 75 of the connector receptacle 39 will be engaged with the hollow part 38e of the above mentioned connector 38. Thereby, a plurality of male contacts 70 will be inserted into the female contacts 73 and these male and female contacts 70 and 73 will be mechanically connected with each other. However, at this time point, the switch 66 will not be closed and therefore the relay contact of the relay 67 will not be closed. Therefore, no current will be conducted to the above mentioned female contacts 73 and, in case the contacts 70 and 73 are connected with each other, no momentary excess current will be generated between these contacts 70 and 73. This excess current will not be fed to the upstream side and downstream side of the connector 38 and connector receptacle 39.

When this connector 38 is rotated in a predetermined direction as by being gripped, the rotary frame 71 of the above mentioned connector 38 will be rotated within the fixed frame 69 with the above mentioned male and female contacts 70 and 73 mechanically connected with each other. With this rotation, the rigid ball 77c of the clicking mechanism 77 will be energized on the inner periphery of the above mentioned fixed frame 69 so as to be disengaged with the recesses 69e on the inner periphery of the fixed frame 69 and will be contained in the hole 77a against the energizing force of the resilient member 77b. As the positioning pin 38d of the above mentioned connector 38 is contained in the groove 71d of the rotary frame 71, it will not obstruct the rotation of the above mentioned rotary frame 71. After this rotary frame 71 rotates even slightly, the above mentioned positioning pin 38d will contact the locking part 69b of the fixed frame 69 to prevent the above mentioned connector 38 from moving toward the connector receptacle 39.

When the above mentioned rotary frame 71 is rotated by a predetermined angle with the male and female contacts 70 and 73 connected with each other, the dog 74 fixed to this rotary frame 71 will press the switch 66 arranged on the rear end surface 69c of the fixed frame 69 so as to be switched on. When this switch 66 is closed, the relay contact of the relay 67 will be closed and the conducting lines 70a and 73a will become conductive. At this time, the male and female contacts 70 and 73 will be in perfect contact with each other and therefore the driving signals V+, $\Phi H_1$, $\Phi H_2$, $\Phi V_1$ and $\Phi V_2$ will be correctly fed to the solid state imaging device 3 within the electronic endoscope 21 at the same time.

When the above mentioned rotary frame 71 is rotated until the above mentioned dog 74 switches on the switch 66, the hole 77a of the above mentioned clicking mechanism 77 will be opposed to the other recess 69f formed on the inner periphery of the fixed frame and the above mentioned rigid ball 77c will be projected by the energizing force of the resilient member 77b so as to be engaged with the above mentioned recess 69f. The above mentioned rotary frame 71 is regulated in the rotation by this clicking mechanism 77. Even if the grip of the above mentioned connector 38 is released, this rotary frame 71 will not be rotated and the operation of switching on the above mentioned switch 66 will not be stopped.

The case of disconnecting the connector 38 and connector receptacle 39 with each other shall be explained in the following. When the above mentioned connector 38 is rotated in the direction reverse to the above mentioned direction, the rigid ball 77 and recess 69f will be disengaged with each other, the pressing of the switch 66 by the dog 74 will be stopped and this switch 66 will be operated to be off. When the switch 66 is opened, the relay contact of the relay 67 will be opened, the driving signals V+, $\Phi H_1$, $\Phi H_2$, $\Phi V_1$ and $\Phi V_2$ will be broken by the relay 67 at the same time and will not be transmitted to the male and female contacts 70 and 73. Therefore, for example, during the operation of connecting or disconnecting the connector 38, even in case the male and female contacts 70 and 73 are in a mixed state of contact and no contact with each other, so driving signal will, be fed at all to the solid state imaging device 3 which will not be placed in an electrically abnormal state.

Further, when the above mentioned connector 38 is rotated, the dog 74 fixed to the rotary frame 71 will contact the stopper 76 arranged on the rear end surface 69c of the above mentioned fixed frame 69 and thereby the rotation of this rotary frame 71 sill be stopped. Then, the hole 77a of this rotary frame 71 is opposed to the recess 69 on the inner periphery of the fixed frame 69, the rigid ball 77 in the above mentioned hole 77a will be projected by the energizing force of the resilient member 77b so as to be engaged with the above mentioned recess 69e to fix the above mentioned rotary frame 71.

The position of the groove 71d provided in the above mentioned rotary frame 71 and the position of the groove 69d of the locking part 69b of the fixed frame 69 will coincide with each other, the positioning pin 38d of the connector 38 will not contact the above mentioned locking part 69d and this connector 38 will be able to be moved in the direction reverse to the connector receptacle 39. When this connector 38 is moved, the fitting part 38c of this connector 38 will be pulled out of the hole 71c of the rotary frame 71 and the above mentioned male and female contacts 70 and 73 will be disconnected with each other.

In this embodiment, the circuits will be electrically connected after the connector 38 and connector receptacle 39 are mechanically connected with each other and the circuits will be electrically broken before the connector 38 and connector receptacle 39 are mechanically disconnected with each other. Therefore, no excess current or the like will flow through the solid state imaging device which can be prevented from being damaged.

By the way, in this embodiment, there has been explained an example of a formation wherein the electronic endoscope 21 is used for the endoscope apparatus 20 so that a video signal by this electronic endoscope 21 may be input into the video processor 6. However, the one used for this endoscope apparatus 20 is not to be limited to the electronic endoscope 21. For example, an endoscope fittable with a video camera or the like in the eyepiece part may be used so that the video signal by this video camera may be input into the video processor 26 through the connector 38 and connector receptacle 39 and the above mentioned video camera may be controlled by this video processor 26.

In these embodiments, the dog 74 is fixed to the rotary frame 71 or sliding frame 86 arranged within the connector receptacle 39. However, the members to which the above mentioned dog 74 is fixed need not be limited to these. For example, the dog 74 may be provided on the connector 38 side so that, after the male and female contacts 70 and 73 are connected with each other, this connector 38 may be slid with respect to the connector receptacle 39 to switch on the above mentioned switch 66. Also, the dog 74 may be provided on either of the connector 38 and connector receptacle 39 so that, while the male and female contacts 70 and 73 are connected by this dog 74, the switch 66 may be switched on and off.

Also, in this embodiment, the above mentioned switch 66 is arranged within the video processor 26 but is not limited to be arranged within the video processor 26 but may be arranged, for example, within the connector receptacle 39 or on the connector 38 side.

Further, the connector 38 and connector receptacle 39 of this embodiment are not limited to be of the above described formation but may be of any formation wherein, while the male and female contacts 70 and 73 are connected with each other, the conduction to these contacts 70 and 73 is switched on and off.

Figure 16:
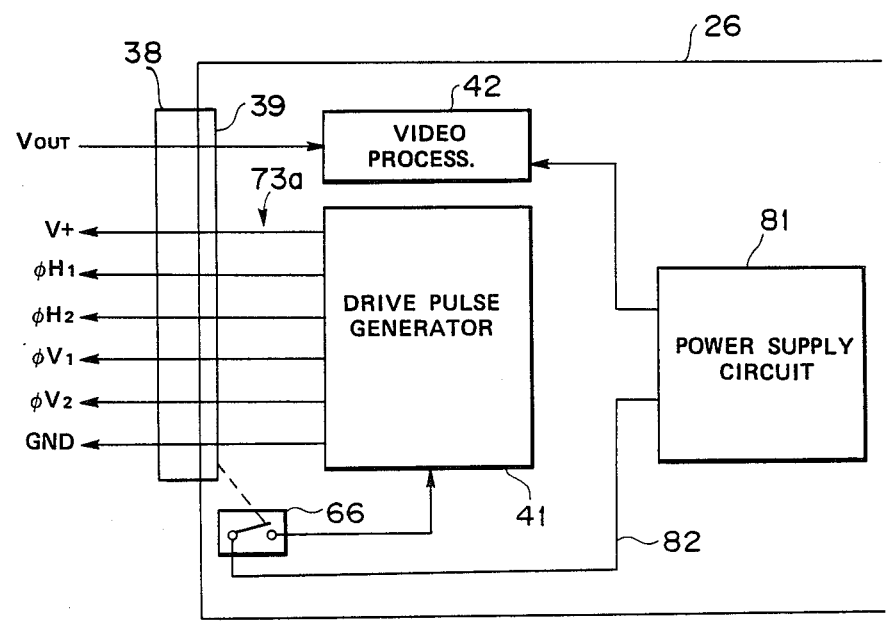
FIG. 16 is a block diagram showing a modification of the connector part in the third embodiment.

FIG. 16 shows a modification of the third embodiment.

A power supply circuit 81 is provided within the video processor 26 to supply power to the video signal processing circuit 42 and driving pulse generating circuit 41. A switch 66 is connected to a power supply line 82 supplying power to this driving pulse generating circuit 41 so that, during the operation of connecting and disconnecting the connector 38, no driving signal may be supplied to the solid state imaging device and the driving pulse generating circuit 41 may not be operated.

The other formations and effects are the same as in the third embodiment.

Figure 17:
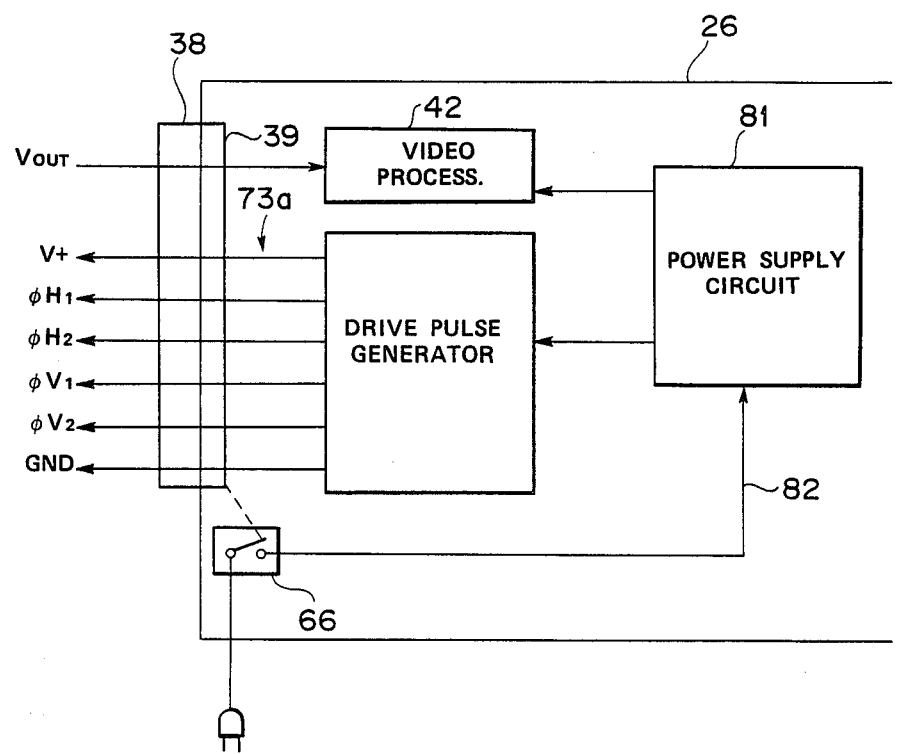
FIG. 17 is a block diagram showing another modification of the connector part in the third embodiment.

FIG. 17 shows another modification of the third embodiment.

The power supply circuit 81 is provided within the video processor 26 to supply power to the video signal processing circuit 42 and driving pulse generating circuit 41. The power is to be supplied through the switch 66 from an external power supply circuit to this power supply circuit 81. Therefore, the switch 66 is to open and close the power supply circuit of the entire video processor 26.

The other formations and effects are the same as in the third embodiment.

Figure 18A:
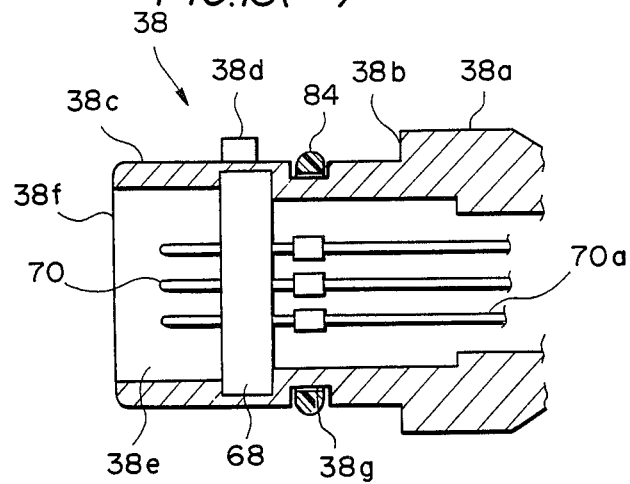
FIG. 18 relates to the fourth embodiment of the present invention and is a sectioned view of a connector and connector receptacle.
Figure 18B:
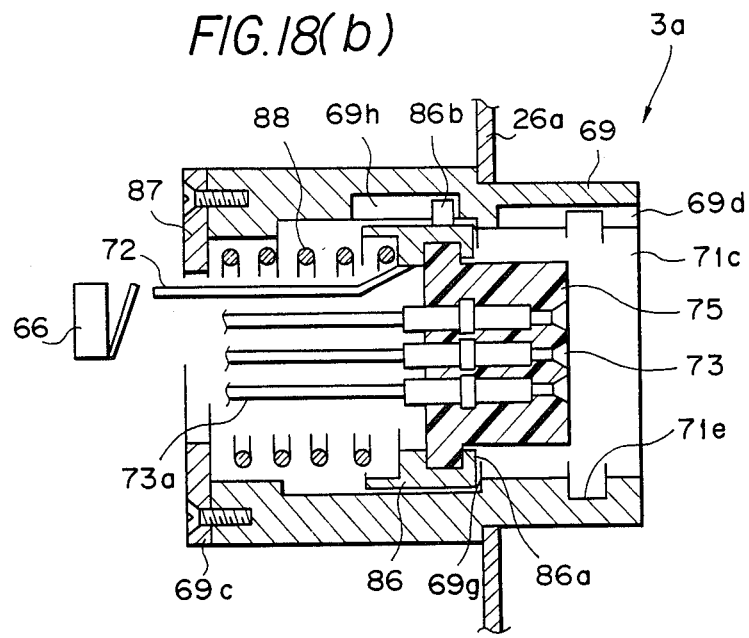

FIG. 18 shows the fourth embodiment of the present invention.

By the way, the same members and the same operating members as in the above described third embodiment shall bear the same reference numerals to omit the explanation.

In this embodiment, the fitting part 38c of the connector 38 is extended to be formed, an engaging groove 38g is annularly provided in the position farther away from tip surface than the positioning pin 38d of this fitting part 38c and an elastic member 84 having an elasticity and formed, for example, to be C-shaped is engaged with this engaging groove 38g. On the other hand, a groove 71e with which this elastic member 84 is to be engaged is annularly provided in the position corresponding to this elastic member 84 of a hole 71c of the connector receptacle 39.

A rotary frame 71 engaged within a fixed frame 69 of the above mentioned connector receptacle 39 is formed as a sliding frame 86 slidable in the axial direction of the above mentioned fixed frame 69. A compression spring 88 is arranged between this sliding frame 86 and a spring retainer 87 fixed to the rear end surface 69c of the above mentioned fixed frame 69 so that the above mentioned sliding frame 86 may be always energized toward the connector 38 and, on the other hand, the tip surface 86a of this sliding frame 86 may contact a step part 69g formed on the inner peripheral surface of the above mentioned fixed frame 69 to position the sliding frame 86.

A projection 86b is formed on one side of the outer peripheral surface of the above mentioned sliding frame 86. A sliding groove 69h is provided in the position opposed to this projection 86b of the inner periphery of the above mentioned fixed frame 69. In case the above mentioned sliding frame 86 is slid against the energizing force of the compression spring 88, this projection 86b will be slid within the sliding groove 69h to prevent the above mentioned sliding frame 86 from rotating with respect to the fixed frame 69.

The dog 74 extended rearward farther than the above mentioned spring retainer 87 is fixed to the above mentioned sliding frame 86. On the other hand, a switch 66 is arranged within the video processor 4 so that, in case the above mentioned sliding frame 86 is slid, the above mentioned switch 66 will be operated to be on by this dog 74.

In case the connector 38 and connector receptacle 39 are to be fitted to each other by such formation, when the fitting part 38c of the above mentioned plug is inserted into the connector receptacle 39 while the position of the positioning pin 38d of the connector 38 is made to coincide with the groove 69d, then, by the same operation as is described above, the male contacts 70 of the connector 38 and the female contacts of the connector receptacle 39 will be connected with each other and the holding member 68 of these male contacts and the holding member 75 of the above female contacts 73 will contact each other.

In this case, the holding member 75 to which the above mentioned female contacts 73 are fixed will not slide because the sliding frame 86 is energized by the compression spring 88 and the above mentioned male and female contacts 70 and 73 will be smoothly jointed.

Then, when the above mentioned connector 38 is further pressed toward the connector receptacle 39, the above mentioned holding member 75 will be pressed by the holding member 68, the sliding frame 86 will be slid with respect to the fixed frame 69 against energizing force of the compression spring 88, the dog 74 fixed to the sliding frame 86 will press the switch 66 to be operated to be on. At the same time, the elastic member 84 engaged with the fitting part 38c of the above mentioned connector 38 will be engaged with the groove 71e of the fixed frame 69 to fix this connector 38.

In case the fitting of the above mentioned connector 38 and connector receptacle 39, is to be released, when the connector 38 is moved as by being gripped in the direction away from the connector receptacle 39, with this movement, the holding member 75 of the female contacts 73 will be moved by the energizing force of the compression spring 88. Then, the dog 74 will be separated from the above mentioned switch 66 which will be operated to be off and thereby the conduction to the above mentioned male and female contacts 70 and 73 will be stopped.

Then, the tip surface 86a of the above mentioned sliding frame 86 will contact the step part 69g and this sliding frame 86 will be stopped. Further, when the above mentioned connector 38 is moved, the above mentioned male and female contacts 70 and 73 will be disconnected with each other.

In these embodiments, as the positioning pin 38d is projected on the connector 38 and the groove 69d engaged with the above mentioned positioning pin 38*d* is formed on the connector receptacle 39 side, there is an effect that the above mentioned connector 38 and connector receptacle 39 can be relatively positioned easily.

The other formations and effects are the same as in the third embodiment.

By the way, the present invention, can be applied not only to the above mentioned embodiments, for example, to the one in which straight viewing and side viewing are possible with a side viewing adapter but also to the case of converting the back image to a right image in a side viewing type electronic endoscope in which only the side viewing is possible.

The present invention can be applied also to an electronic endoscope of a straight viewing type wherein a solid state imaging device 3 is arranged parallelly in the lengthwise direction of the insertable part and an object image is formed on the above mentioned solid state imaging device 3 through a reflecting member.

Also, in the endoscoped wherein the straight viewing and side viewing are possible by a side viewing adapter 7, a means of sensing that the side viewing adapter 7 is fitted is provided and an inversion and non-inversion control circuit 56 may be switched by the output of this sensing means.

Further, the imaging means is not limited to the solid state imaging device 3 provided in the tip part of the insertable part but also may be a television camera fitted to the eyepiece part of a fiberscope.

The field memories are not limited to two. Any number more than two may be provided to be sequentially and selectively used.

Further, the color imaging system is not limited to a simultaneous system but may be a frame sequential system wherein the illuminating light is sequentially switched to R, G and B. In the case of this frame sequential system, a plurality of sets of R, G and B memories may be provided instead of the above mentioned 1-field memories 45A and 45B.

As explained in the above, according to the present invention, there are effects that, by reading out memories in the scanning line number order reverse to that at the time of writing in, the observed image imaged by the imaging means can be vertically inverted any by a simple circuit formation, the image can be inverted and the back image can be converted to a right image.

As the other effects, in connecting and disconnecting the connector and connector receptacle with each other, no temporary excess current will be generated and electric devices can be prevented from being adversly influenced.

What is claimed is:

1. An electronic endoscope apparatus to be inserted into an observed object part to image the observed image comprising:

an imaging means imaging said observed image to be converted to an electric signal;

a signal processing means producing a video signal from said electric signal;

a plurality of memory means each having at least 2 memory areas in which said video signal can be memorized by at least 1 field part in the scanning line number order, can be written at least every field and can be read out in the scanning line number order reverse to that at the time of writing in; and a displaying means displaying the video signal read out of said memory means.

2. An electronic endoscope apparatus according to claim 1 further comprising a writing in and reading out control means controlling the writing in and reading out of said video signal.

3. An electronic endoscope apparatus according to claim 2 herein said writing in and reading out control means comprises an address control means generating an address number corresponding to the scanning line number and a selecting means selecting said memory area corresponding to said address number and writing in and reading out the video signal.

4. An electronic endoscope apparatus according to claim 3 wherein said address control means comprises a pulse generating means selectively generating increase pulses controlling the increase of the address number and decrease pulses controlling the decrease of the address number and an address generating means counted up or counted down by the input of said increase pulses or decrease pulses, generating an address number and inputting it into said selecting means.

5. An electronic endoscope apparatus according to claim 4 wherein said pulse generating means further comprises a switching means generating a control signal selecting whether the generated pulse is made said increase pulse or said decrease pulse.

6. An electronic endoscope apparatus according to claim 1 wherein said memory means comprises a mark generating means generating a mark showing the state of reading out in the case of reading out in the scanning line number order reverse to that at the time of writing in and superposable on the read out video signal.

7. An electronic endoscope apparatus according to claim 1 further comprising a connecting means which can electrically connect said imaging means and signal processing means with each other.

8. An electronic endoscope apparatus according to claim 7 wherein said connecting means comprises contacts mechanically connecting and disconnecting the circuits and a switch electrically connecting the circuits after they are mechanically connected and electrically breaking the circuits before they are mechanically disconnected.

* * * * *